(12) United States Patent  (10) Patent No.: US 8,528,053 B2
Kinsel et al.  (45) Date of Patent: Sep. 3, 2013

(54) DISAMBIGUATING ONLINE IDENTITIES

(75) Inventors: Patrick Kinsel, Seattle, WA (US); Matthew Graham Dyor, Bellevue, WA (US); Stefan David Weitz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/821,281

(22) Filed: Jun. 23, 2010

(65) Prior Publication Data

US 2011/0321129 A1  Dec. 29, 2011

(51) Int. Cl.
*G06F 7/04*  (2006.01)
(52) U.S. Cl.
USPC .......................................................... 726/4
(58) Field of Classification Search
USPC .......................................................... 726/4
See application file for complete search history.

(56) References Cited

U.S. PATENT DOCUMENTS

| 2007/0112761 | A1 | 5/2007 | Xu et al. |
| 2009/0083367 | A1 | 3/2009 | Li et al. |
| 2009/0282002 | A1 | 11/2009 | Reeder et al. |
| 2010/0274815 | A1* | 10/2010 | Vanasco ........................ 707/798 |

OTHER PUBLICATIONS

"OpenID Explained", Retrieved at << http://openidexplained.com/ >>, pp. 1-4, Dec. 6, 2007.
Jennings, David., "Aggregation of Data Across Social Networks", Retrieved at << http://alchemi.co.uk/archives/hum/aggregation_of_.html >>, Aug. 3, 2005, pp. 1-3.
Mobasher, et al., "Discovery of Aggregate Usage Profiles for Web Personalization", Retrieved at << http://webdocs.cs.ualberta.ca/~tszhu/webmining/paper/wum/application/mdlnsw2000.pdf >>, In Proceedings of the WebKDD, Workshop at the ACM SIGKKD, Aug. 2000, pp. 1-11.
"Social Network Aggregation", Retrieved at << http://en.wikipedia.org/wiki/Social_network_aggregation >>, Retrieved Apr. 19, 2010. pp. 1-3.
Malin, Bradley., "Unsupervised Name Disambiguation via Social Network Similarity", Retrieved at << http://hiplab.mc.vanderbilt.edu/people/malin/Papers/malin_siam_2005.pdf >>, In Workshop on Link Analysis, Counterterrorism and Security, 2005, pp. 93-102.

* cited by examiner

*Primary Examiner* — Jacob Lipman
(74) *Attorney, Agent, or Firm* — Medley, Behrens Lewis, LLC

(57) ABSTRACT

Described herein are technologies pertaining to disambiguating identities/accounts over a plurality of online services. Public data streams pertaining to accounts of different online services are analyzed, and a determination is made that the accounts are owned by a same user. A searchable profile is generated for the user that comprises data that indicates that the user represented by the profile owns the accounts. The profile is claimable by the user such that the user is enabled to customize contents of the profile.

20 Claims, 11 Drawing Sheets

DISAMBIGUATING ONLINE IDENTITIES

BACKGROUND

Currently a user may create accounts with a plurality of different online services. Such services can include but are not limited to social networking services, professional networking services, a broadcasting service that broadcasts messages from users and followers or to a public stream, a blogging service, a photo upload and retention service, a service that allows users to rate movies and/or music amongst, other services. For each of these services the user creates an online account and has an identity corresponding to such account that represents the user. These identities can refer to an actual name of the user, a nickname of the user, a pseudonym, etc.

Each of these online services generally operates independently from other online services. Accordingly, conventionally it is difficult to disambiguate identities corresponding to a user across several online services. For example, a searcher may wish to search for a user by name through utilization of a search engine. When the searcher queries for "Tom Smith", for instance, a search engine can return a set of separate results, many of which may be correct (e.g., the search engine returns search results that relate to the "Tom Smith" being searched for by the user). Such results, however, are conventionally entirely disjoined. For example, the search engine may return Tom Smith on a first online service, Tom Smith on a second online service, etc. Each of these is returned as separate search result. Thus, the search engine is entirely unaware that each of the search results is separate online representations of the user Tom Smith.

This problem is compounded if more than one Tom Smith has accounts corresponding to online services that can be searched by way of the search engine. Accordingly, the user searching for Tom Smith may be provided a plurality of different search results, which may or may not correspond to the Tom Smith being searched for by the user. Additionally a user searching for a particular individual currently has no means for quickly ascertaining which online services are subscribed to by the individual. Continuing with the Tom Smith example, the searcher will be unable to quickly ascertain whether or not a Tom Smith of interest uses a particular online services or set of online services.

SUMMARY

The following is a brief summary of subject matter that is described in greater detail herein. This summary is not intended to be limiting as to the scope of the claims.

Described herein are various technologies pertaining to disambiguating identities/accounts across multiple different online services. A user may individually create accounts with several different online services, including social networking services, professional networking services, video uploading/viewing services, video renting services, blogging services, amongst various other types of services. An account created by the user for each of the services may be under the name of the user, a pseudonym of the user, a nickname of the user, etc. Described herein are various technologies for determining that several different identities/accounts across multiple different online services are, in fact, representations of the same unique user.

Described herein are various techniques for making such determination. First, public data streams (e.g., activity streams) can be analyzed with respect to various accounts over several online services. These data streams can include status updates to social networking services, new photos uploaded to a photo sharing/photo retention service, a new message broadcast by way of a broadcasting service, a comment posted on a blog, etc. In an example, data streams from different accounts on different online services can be analyzed to determine if two data streams have substantially similar content that was posted by the owner(s) of the accounts at a substantially similar point in time. For instance, services may exist that allow a user to post to multiple different online services from a single location at a substantially similar point in time. Thus, the user through utilization of such service can generate a single message that is then automatically posted to different accounts of the user across various online services. Accordingly, monitoring public data streams for substantially similar content at substantially similar times captures the notion that a user may use one of the posting services to post content across multiple services, which indicates that the user is the owner of all of the different accounts that have the substantially similar content posted at substantially similar points in time.

When making this determination that each of these accounts correspond to the single unique user, the content can be analyzed for uniqueness. That is, very common phrases posted at substantially similar times may not indicate that two accounts are owned by the same user but instead may just be a matter of coincidence. If, however, the content is unique and is shared across multiple accounts at substantially similar points in time, there is a high probability that a single user owns the multiple accounts.

In another example, some online services allow users thereof to link their online services together in some way. For example, an online photo sharing/retention service and an online broadcasting service may be linked in such a manner to allow the user to log into the photo sharing/retention service, indicate that the user wishes to broadcast a particular photo through the account of the user on the broadcasting service, and cause the photo sharing/retention service to post the message via the broadcasting service on behalf of the user. Continuing with this example, a public data stream corresponding to the user account on the broadcasting service (a first online service) can be analyzed to locate data that indicates that content of the data stream was posted through utilization of the photo sharing/retention service (a second online service). This data may point to a particular account of the second online service. In a particular example, the data stream corresponding to the account of the user on the broadcasting service may include data that indicates that the content was posted by way of the photo sharing/retention service. The URL of the photo can be extracted from the content of the message, and the photo sharing/retention service can be provided with the URL (e.g., the photo sharing/retention service may expose an API that allows URLs of photos to be provided to the photo sharing/retention service). The photo sharing/retention service may then identify an account that owns the photograph corresponding to the URL. It may then be ascertained that the broadcasting account that posted the photo and the account of the photo sharing service that retains the particular photograph are owned by the same user.

Of course, the photo sharing service and the online broadcasting service are merely examples of two services that can be linked to one another in a form that allows a user to communicate through one online service by way of another online service. These online services may communicate by way of one another through utilization of certain protocols/rules. That is, each time one online service generates data in a data stream on behalf of another online service, content may be included in the data stream that can be utilized to ascertain the relationship between the two services. Rules can be defined that allow these relationships to be utilized to disambiguate identities/accounts of a user across the online services. These rules can be generated by an identity disambiguating service or can be generated by a particular online service and provided to the identity disambiguating service. For instance, a particular blog may wish to increase its visibility. Accordingly, the blog may be configured to post messages to another online service with respect to a particular user, and may desire that the blog account and the account of the online service be disambiguatable. Thus, the owner of the blog can generate a rule describing how the blog is linked to the online service, and such rule can be provided to the entity disambiguating service.

Once identities/accounts across multiple online services have been disambiguated as belonging to a particular user, a profile for such user can be automatically generated. This profile can indicate that the user has certain accounts across the multiple online services. Pursuant to an example, this profile can be searchable such that a search engine can receive a query for the name of the user and, responsive to receipt of the query, the search engine can provide the searcher with the profile of the user. This profile can include data that indicates to the searcher that the user has accounts with various different online services. Moreover, the profile can provide the searcher with messages recently posted by the user by way of the multiple online services.

Moreover, the user can claim an online profile corresponding to the user and craft the profile in such a way to control the content that is available to searchers. For instance, the profile can be generated based solely upon data that has been deemed to be public data by the user. Once all this data is aggregated, however, user may not wish to share all such data in one location. Therefore, the user can verify ownership of one or more of the various accounts (an interface can be provided that allows the user to verify that they are the owner of one or more of the accounts) and thereafter the user can control what content is shown on their profile.

Other aspects will be appreciated upon reading and understanding the attached figures and description.

DETAILED DESCRIPTION

Figure 1:
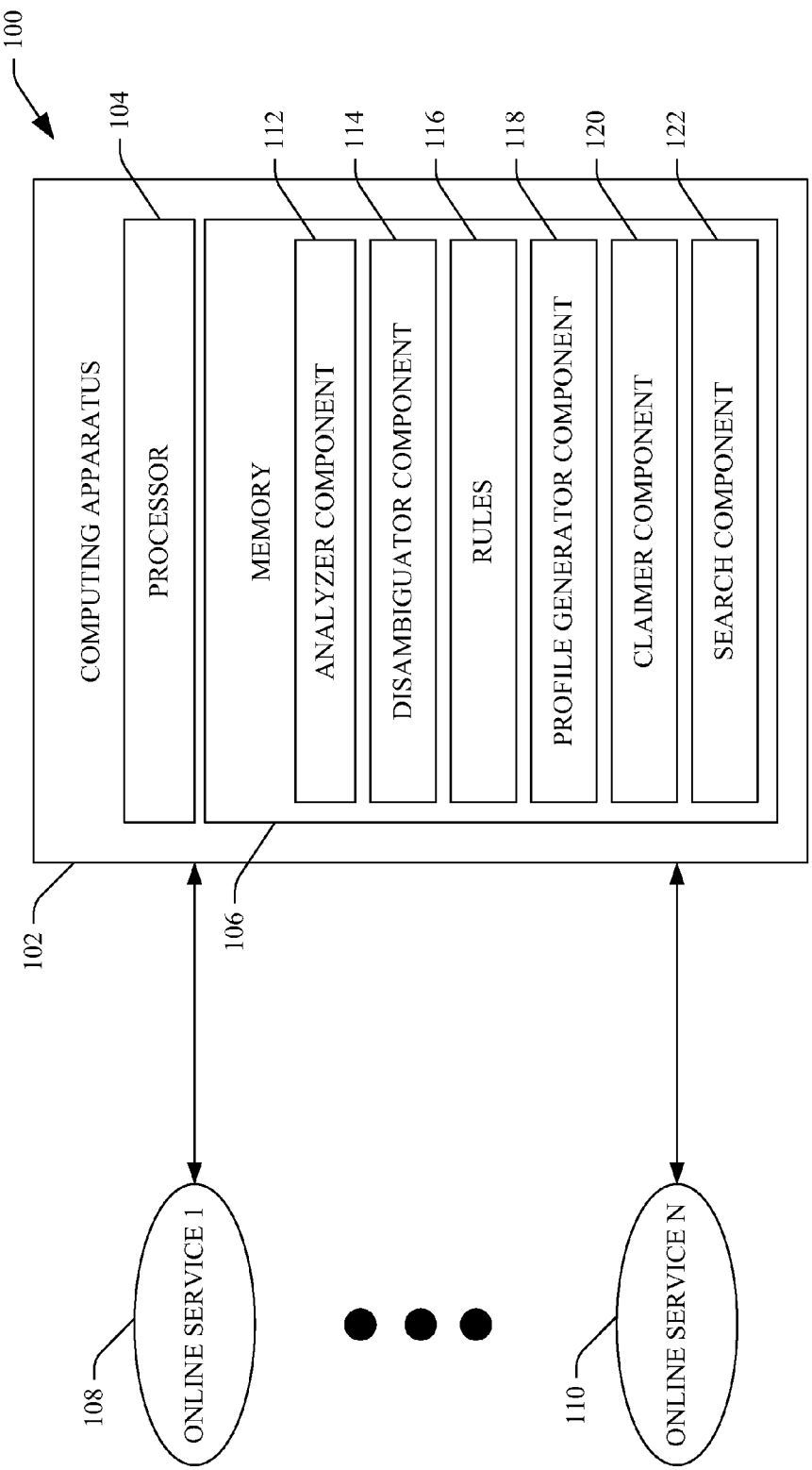
FIG. 1 is a functional block diagram of an example system that facilitates disambiguating identities/accounts across a plurality of online services.

Various technologies pertaining to disambiguating identities/accounts across different online services will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an exemplary system 100 that facilitates disambiguating identities/accounts across multiple online services is illustrated. The system 100 comprises a computing apparatus 102 that includes a processor 104 and a memory 106. The computing apparatus 102 may be any suitable computing apparatus and may be a distributed apparatus. For instance the computing apparatus 102 may be a server, a collection of servers in a cloud computing environment, a desktop computing device, etc.

The computing apparatus 102 is configured to be in communication with a plurality of online services 108-110. The computing apparatus 102 may be in communication with the online services 108-110 by way of some suitable network connection which may be wireless, wirelined or a combination of wireless and wirelined. The online services 108-110 can be a variety of different types of online services. Each of the online services 108-110 may allow a user to create an account with such online service and post messages utilizing such account. A message, as used herein, is intended to include, but is not limited to, text, video, audio, photographs, images, animations, or some suitable combination thereof. A user, as used herein, is intended to encompass a person, an organization (such as a business or charitable organization), a service, a device or collection of devices that can broadcast messages, and the like.

Pursuant to an example, the online services 108-110 may include a social networking service that is configured to allow a user to post status updates, post images, transmit instant messages to contacts of the user, etc. In another example, the online services 108-110 can include a professional networking service that is configured to allow the user to generate post messages indicative of professional qualifications of the user, current position of employment of the user, educational background of the user, etc. In yet another example, the online services 108-110 can include a photo sharing/photo retention service. In such a service, the user can create an account, upload digital photos and/or videos to the account and cause the photos and/or videos to be available to the general public or selected contacts for viewing by way of an Internet browser. In still yet another example, the online services 108-110 can include a broadcasting service that is configured to allow the user to broadcast one or more messages to followers/subscribers of the user and/or to a public data stream. In another example, the online services 108-110 can include a web logging (blogging) service that is configured to allow the user to create an account with a blog and post comments on such blog. In yet another example, the online services 108-110 can include services configured to allow the user to rate movies or music, provide comments with respect to movies or music, etc. Further, the online services 108-110 can be location-based services, such as services that allow users to publish their current or past geographical locations to contacts of the users, to other services, and/or to a public data stream. Accordingly, the online services 108-110 are intended to include any suitable service that is configured to allow the user to create an account and to generate messages that correspond to such account.

As mentioned previously, the online services 108-110 may be configured to output messages generated by users with accounts with the online services. The computing memory 106 of the computing apparatus 102 comprises a plurality of components that are executable by the processor 104, wherein execution of such components is undertaken in connection with disambiguating identities/accounts of a user across multiple online services. The components in the memory 106 comprise an analyzer component 112 that is configured to analyze public data streams output by one or more of the online services 108-110. A public data stream is a data stream that the user of the online service has not indicated should be kept private. Thus, information deemed by the user to be private information is not accessible to the analyzer component 112. Each data stream corresponds to a particular account of an online service, and a data stream includes a plurality of messages posted by way of the particular account.

As mentioned above, the analyzer component 112 can be configured to analyze the contents of one or more public data streams output by the online services 108-110. In a first example, an analysis undertaken by the analyzer component 112 can include a comparison of at least two public data streams pertaining to two accounts of two different online services. In another example, the analyzer component 112 can analyze a public data stream pertaining to an account of one of the online services 108-110 to search for data that indicates that at least one message in the data stream corresponds to a different one of the online services 108-110. These types of analyses that can be undertaken by the analyzer component 112 will be described in greater detail below.

The memory 106 may also comprise a disambiguator component 114 that can automatically disambiguate accounts across multiple online services. In other words, the disambiguator component 114 can determine (e.g., with a computed probability) that a single unique user is an owner of two different accounts on two different online services.

The memory 106 can also comprise a plurality of rules 116 that can be utilized to locate relationships between accounts of different online services. For example, some online services are currently configured with an ability to cause another online service to post a particular message. For instance, an online service may be a photo sharing/retention service. This photo sharing/retention service may be configured to allow a user to upload a photo to such service and then may be further configured to cause the photo to be broadcast to followers of the user by way of a separate online broadcasting service. Thus, for instance, upon uploading the photo to the photo sharing service, the user can be provided with an option to share the photo by way of the online broadcasting service. The online broadcasting service may post the message with an identifier that is unique to the photo sharing/retention service (but may not be unique to the user). If such identifier corresponding to the photo sharing/retention service is located, however, the URL of the photo being shared by way of the online broadcasting service can be extracted from the message posted by way of the broadcasting service. The photo sharing/photo retention service may expose an Application Programming Interface (API) that allows an entity to request an identity of an account owner that owns the account corresponding to the URL of the photo. The online photo sharing/retention service may then output the identity of the account owner.

In this example, one of the rules 116 may be a rule that causes a public data stream of the broadcasting service to be analyzed to search for an identity corresponding to the photo sharing/retention service. The rule may further specify that upon locating such identity, a URL of a photo in the data stream of the broadcasting service is to be extracted and then provided to the photo sharing/photo retention service. The rule may further specify that the data output by the photo sharing/retention service is an identity of the account to which the photo belongs. Continuing with the example, thereafter the disambiguator component 114 can generate data that indicates that the owner of the account of the photo sharing/retention service also owns the account of the broadcasting service that posted the message. This is, of course, but one example of how two online services can be linked to one another. It is to be understood that any suitable rule that describes how to identify an account owner of a first online service based at least in part upon content of a message posted by way of a second online service is contemplated and intended to fall under the scope of the hereto appended claims.

The memory 106 in the computing apparatus 102 also comprises a profile generator component 118 that can generate a profile of a user that has accounts with multiple online services, wherein the disambiguator component 114 determined that the multiple accounts are owned by such user. For instance, once the disambiguator component 114 generates data that indicates that a particular user owns a plurality of accounts across various online services, the profile generator component 118 can generate a profile that indicates that the user owns the aforementioned accounts. Additionally, the profile generator component 118 can indicate a probability that certain accounts are owned by the user.

Once the profile has been generated by the profile generator component 118 and other profiles have been generated by the profile generator component 118, these profiles can be utilized for a variety of purposes. For example, interests of a particular user can be obtained from public data streams pertaining to the certain user. These interests can be utilized for targeted advertising. In another example, profiles of particular users can indicate that such users have expertise in certain topics. Specifically, profiles generated by the profile generator component 118 can capture aggregated messages output from a user through various different online services. This aggregation of messages can be employed to establish topical authority scores for each profile/user. These per user topical authority scores can be employed to influence the ranking of people and their associated contributions on the web when users query a search engine for a certain topic. That is, if a user utilizes a search engine to search for a certain topic, the search engine can return the profile of the user responsive to receipt of such search query and provide the profile as a search result to the query. In another example, the search engine may determine that the user is an authority on the query term and would return data produced by the authority.

The memory 106 can also comprise a claimer component 120 that can allow the user that owns the accounts that are disambiguated to claim the profile generated by the profile generator component 118. For example, the user may access a search engine and search for his or her name. Responsive to receipt of a query, the search engine can return a profile of such user, wherein the profile can include data that identifies the user and aggregated messages from different online services generated by the user. Again, these messages are only messages that are available to the general public. Accordingly, privacy preferences of the user are respected. The user may, however, not wish that all his or her activities be aggregated in one place. For instance, the user may wish to keep his social networking activities entirely separate from his professional networking activities. Therefore, the user can claim the profile. Claiming the profile can include providing data to the claimer component 120 that uniquely identifies the user and allows the claimer component 120 to ascertain that the user owns the accounts included in the profile. For example, the user, by way of the claimer component 120, can claim ownership of a particular account with respect to a certain online service. Once accounts have been verified by the user, the user can effectively shape the profile such that it represents how the user would like others to see his or her aggregated online activity through the online services 108-110.

The memory 106 may also comprise a search component 122 that is configured to allow searchers to search for users and be provided with profiles pertaining to such users. For example, a searcher may search for the user "Tom Smith" by way of the search component, which may be a search engine or may be included in a search engine. The search component 122 can be configured to provide the searcher with a profile pertaining to "Tom Smith." As will be shown and described herein, this profile can include a name of the user, an indication of a plurality of online services utilized by the user, various activities undertaken through the online services, messages posted by the individual through the online services (shown in a logically arranged manner, etc.). Furthermore, the search component 122 can be configured to highlight attributes of a user corresponding to a returned profile such that a searcher can quickly ascertain that the profile corresponds to the user for whom they are searching.

Continuing with the Tom Smith example, provision of the name Tom Smith may result in a plurality of different profiles being returned to the searcher. The search component 122, through analyzing metadata corresponding to accounts of the profiled users, can output and/or display data that can be utilized to identify the appropriate Tom Smith. This can include age, city of residence, occupation, activities undertaken by the user, recent public messages, etc.

In summary, the computing apparatus 102 is configured to analyze data streams output by the online services 108-110 over various accounts for the purpose of automatically disambiguating identities/accounts across the online services 108-110. Once such identities have been disambiguated, an online persona of a user can be generated that comprises aggregated activities from the online services 108-110 utilized by such user. Other uses of profiles will be described herein and are intended to fall under the scope of the hereto appended claims.

Figure 2:
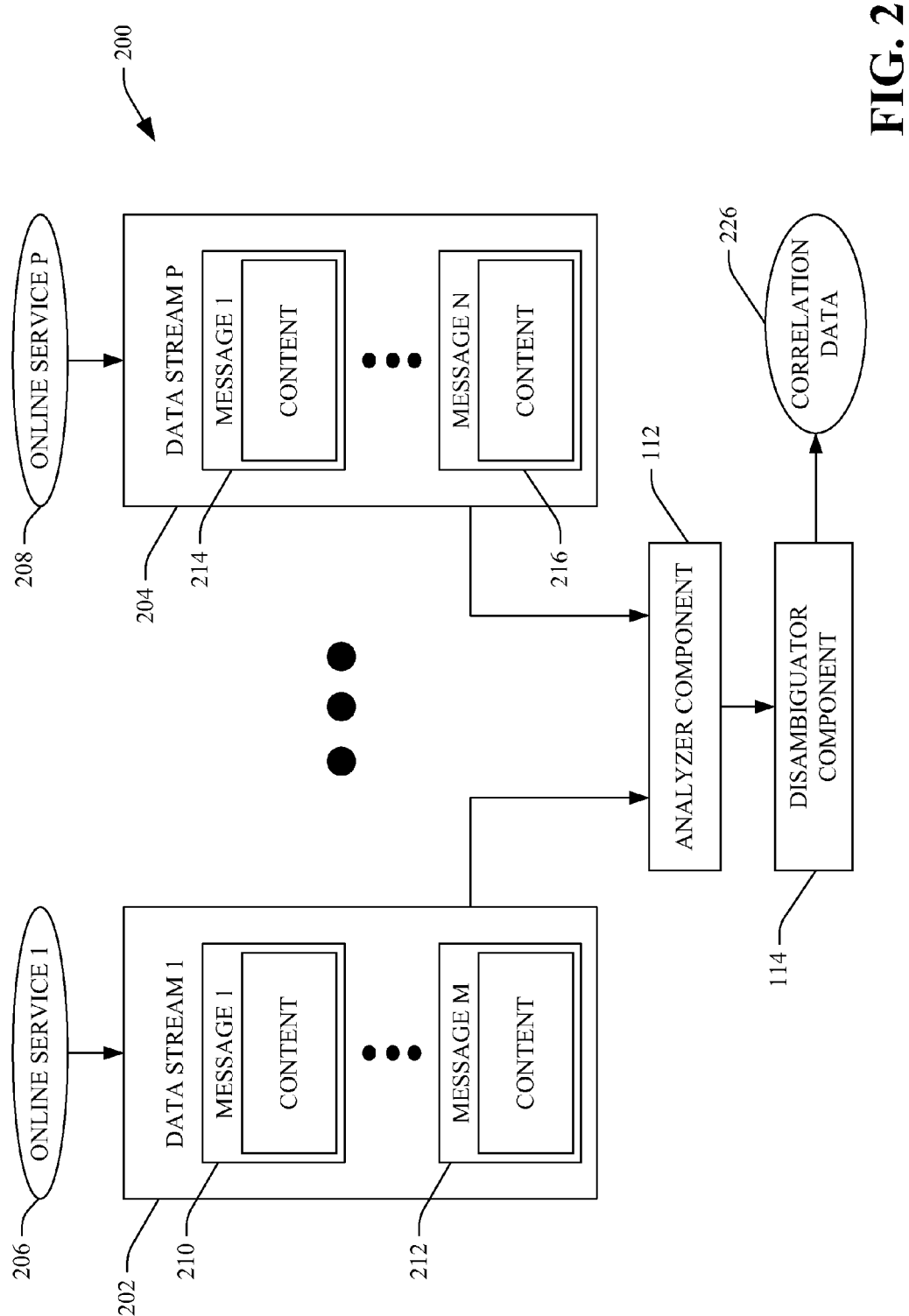
FIG. 2 is a functional block diagram of an example system that facilitates disambiguating identities/accounts of users across multiple online services by comparing contents of data streams output by the online services.

Referring now to FIG. 2, an exemplary system 200 that facilitates disambiguating identities/accounts across different online services is illustrated. The system 200 comprises the analyzer component 112 and a disambiguator component 114, which have been described above. In this example, the analyzer component 112 is configured to receive and analyze a plurality of different data streams 202-204. Specifically, the analyzer component 112 can be configured to receive a first data stream 202 through a Pth data stream 204. The first data stream 202 may be output by a first online service 206 with respect to a first account. Similarly a Pth service 208 can be configured to output the Pth data stream 204 with respect to a second account. The first data stream 202 and the Pth data stream 204 each comprise a plurality of messages over time. In particular, the first data stream 202 comprises a first message 210 through an Mth message 212. The Pth data stream 204 comprises a first message 214 through an Nth message 216. Each of the messages 210-216 comprise contents 218-224, respectively, wherein the contents may include text and an indication of when the messages 210-216 were posted via the services 206 and 208 by the account owner(s).

The analyzer component 112 can be configured to compare the contents 218-220 of the messages 210-212 with the contents 222-224 of the messages 214-216. The analyzer component 112 can search for messages that have substantially similar content posted substantially similar times. That is, the analyzer component 112 can be configured to search for these messages because oftentimes users will post substantially similar (e.g., identical or nearly identical) content on different online services at substantially similar times. For instance, users often update their statuses on accounts in social networking services and thereafter post messages for broadcast via broadcasting services, wherein the status update and the broadcast message is substantially similar. In another example, the content generated by way of a social service may be a location of a user, and the analyzer component 112 can search for similar geographical locations posted to different services at substantially similar times. Furthermore, some services have emerged that enable a user to post a single message that updates the multiple different online services at once. If the analyzer component 112 locates substantially similar messages in data streams pertaining to different accounts on different online services, there is some probability that a single user is the owner of both accounts. Such probability can depend upon a variety of factors, including but not limited to a number of occurrences of substantially similar messages posted at substantially similar times between data streams, uniqueness of messages that are substantially similar to one another and are posted at substantially similar times, amongst other factors. In an example, a generic message such as "it is cold outside" posted from two difference accounts at a substantially similar time may not be sufficiently unique to establish with a high probability that a single user owns the two accounts, while a message from two different accounts across different online services such as "went hiking at Mt. Rainer today—it is cold" may be sufficiently unique such that it is highly probable that the two accounts are owned by the same user.

The disambiguator component 114 can receive the comparisons output by the analyzer component 112 and can generate correlation data 226 that indicates that a particular user owns the accounts of the services 206 and 208 that correspond to the data streams 202 and 204. This correlation data 226 may be data that links the accounts in a database, for example.

Figure 3:
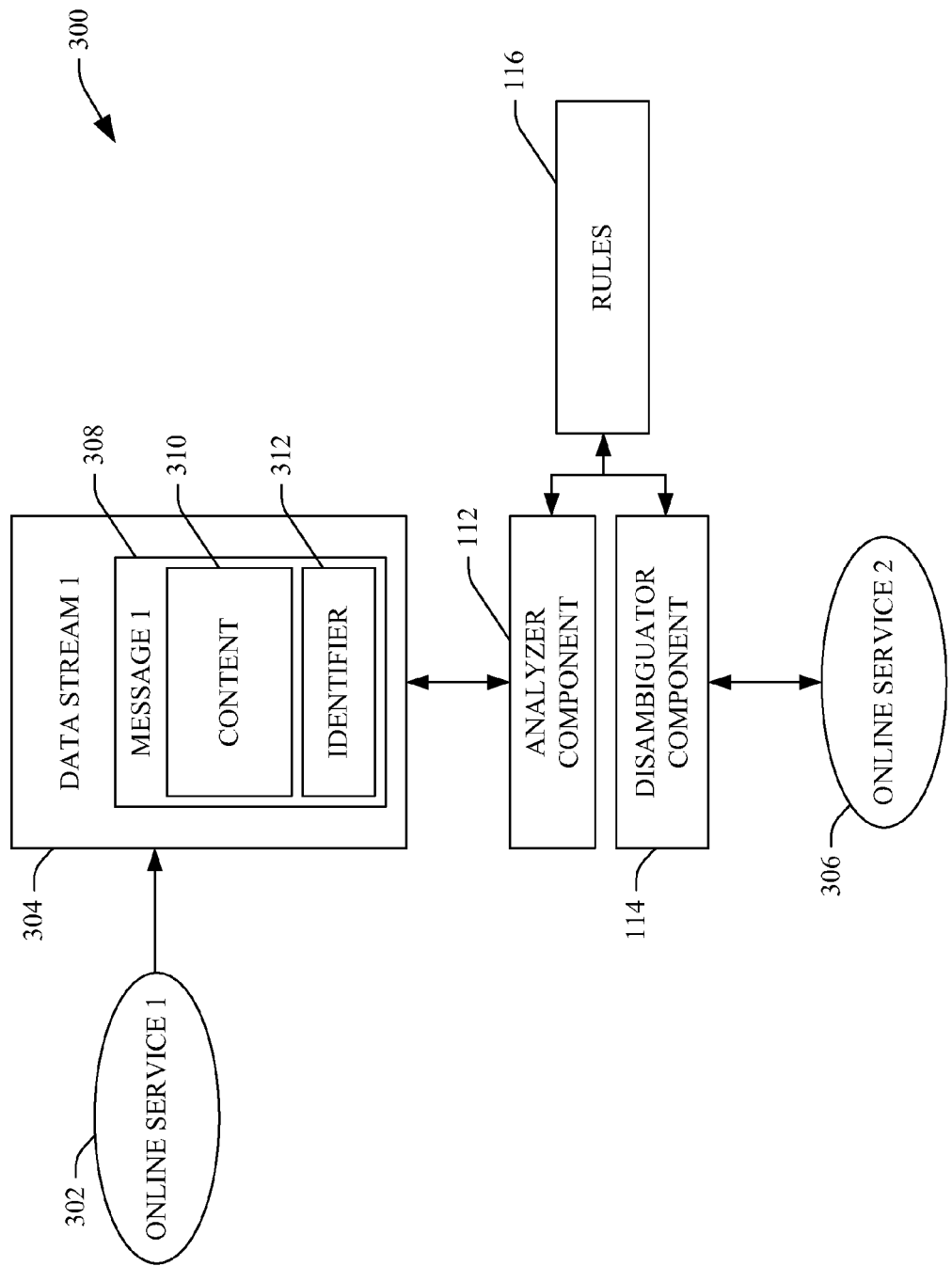
FIG. 3 is a functional block diagram of an example system that facilitates disambiguating identities/accounts across multiple online services through utilization of one or more rules that describe relationships between online services.

With reference now to FIG. 3, another exemplary system 300 that facilitates disambiguating identities/accounts over multiple online services is illustrated. In this example, a user has an account with a first online service 302 and utilizes such account to generate a data stream 304.

In the example depicted in FIG. 3, the first online services 302 may have some known relationship with a second online service 306. For instance, the user may utilize an account with the second online services 306 to post a message via the first online services 302. Therefore, in an example, the second online service 306 may be a social networking service and the user may be able to update her status on the second online service 306. The second online service 306 may also provide an option to the user to cause the status update to be posted as a broadcast by way of a broadcasting service with which the user also has an account. Therefore, in this example, the data stream 304 output by the first online service 302 will include a message 308 that comprises content 310 that is a status update generated by way of the second online service 306. This relationship between the first online service 302 and the second online service 306 can be known, and a rule existent in the rules 116 can utilize knowledge of such relationship to describe how to disambiguate accounts across the first online service 302 and the second online service 306.

When the analyzer component 112 analyzes the data stream 304 output by the online service 302, the analyzer component 112 can consider rules in the rules 116 that pertain to the first online service 302 (e.g., describe relationships between the first online service 302 and other online services). The analyzer component 112 can execute one or more of the rules 116 (e.g., in a rules library) to determine or establish a common ownership of accounts over different online services.

Pursuant to an example, the analyzer component 112 can receive the data stream 304 and can access a rule from the rules 116 that indicates that the first online service 302 that outputs the data stream 304 has a known relationship with the second online service 306. The rule can further indicate that a message in a data stream output by the service 302 that was generated by way of the second online service 306 will have an identifier 312 that indicates that the message 308 was generated by way of the online service 306. This identifier 312 may be particular text that identifies the second online service 306, a particular format that is utilized by the second online service 306, etc. The aforementioned rule may further include actions to undertake to obtain an identity of the owner of the account of the second online service 306 utilized to post the message 308 via the first online service 302. For instance, the second online service 306 may have an API that allows the disambiguator component 114 to provide the second online service 306 with data that is based at least in part upon the identifier 312. Responsive to receipt of such data, the second online service 306 can output data that is indicative of the identity of the owner of the account that was used to generate the message 308.

In a detailed example, the identifier 312 can indicate that the message was generated by a second online service 306, and the contents 310 can include a URL or image that has a URL that corresponds to a server hosted by the second online service 306. The disambiguator component 114 can provide this URL to the second online service 306, and in response the second online service 306 can output an identity of the owner of the account that corresponds to the URL. The disambiguator component 114 may then output an indication that the owner of the account with the second online service 306 is the same user that owns the account with the first online service 302 corresponding to the data stream 304.

It is to be understood that the rules 116 can comprise a plurality of rules that are accessible to the analyzer component 112 and can be executed over the data stream 304. Thus, the analyzer component 112 can consider many known relationships between the first online service 302 and other online services and can search the data stream 304 for data that indicates that such relationship has been utilized to generate a message. Some of the rules 116 may be generated by the system that is performing the disambiguation of accounts.

In other cases, however, it may be desirable to allow an online service to provide rules to the disambiguation system (e.g., the system 300), wherein such rules indicate how the online service and another online service are related. For example, online services with a relatively small number of registered users may wish to provide a disambiguation system with one or more rules that indicate how such online services can interact with a larger online service to increase visibility of the smaller service. For instance, the online service may be a blog and may include functionality for allowing blog posts/comments to be shown on the blog as well as posted as a message via a broadcasting online service. The blog may have a relatively small number of registered users. The blog, however, may wish to increase visibility such that when a search is performed for a user that is registered with the blog, a profile that of the user will be returned that includes aggregated activities of the user across many online services, including activities undertaken by way of the blog. Accordingly the blog can generate a rule that describes how the blog is related to a different online services and such rule can be included in the rules 116. Therefore, when the analyzer component 112 accesses or analyzes a data stream of a particular online service that is related to the blog, the disambiguator component 114 may, according to the particular rule, be able to determine that the account owner of the first online service 302 is the same user as the owner of the account for the particular blog.

Figure 4:
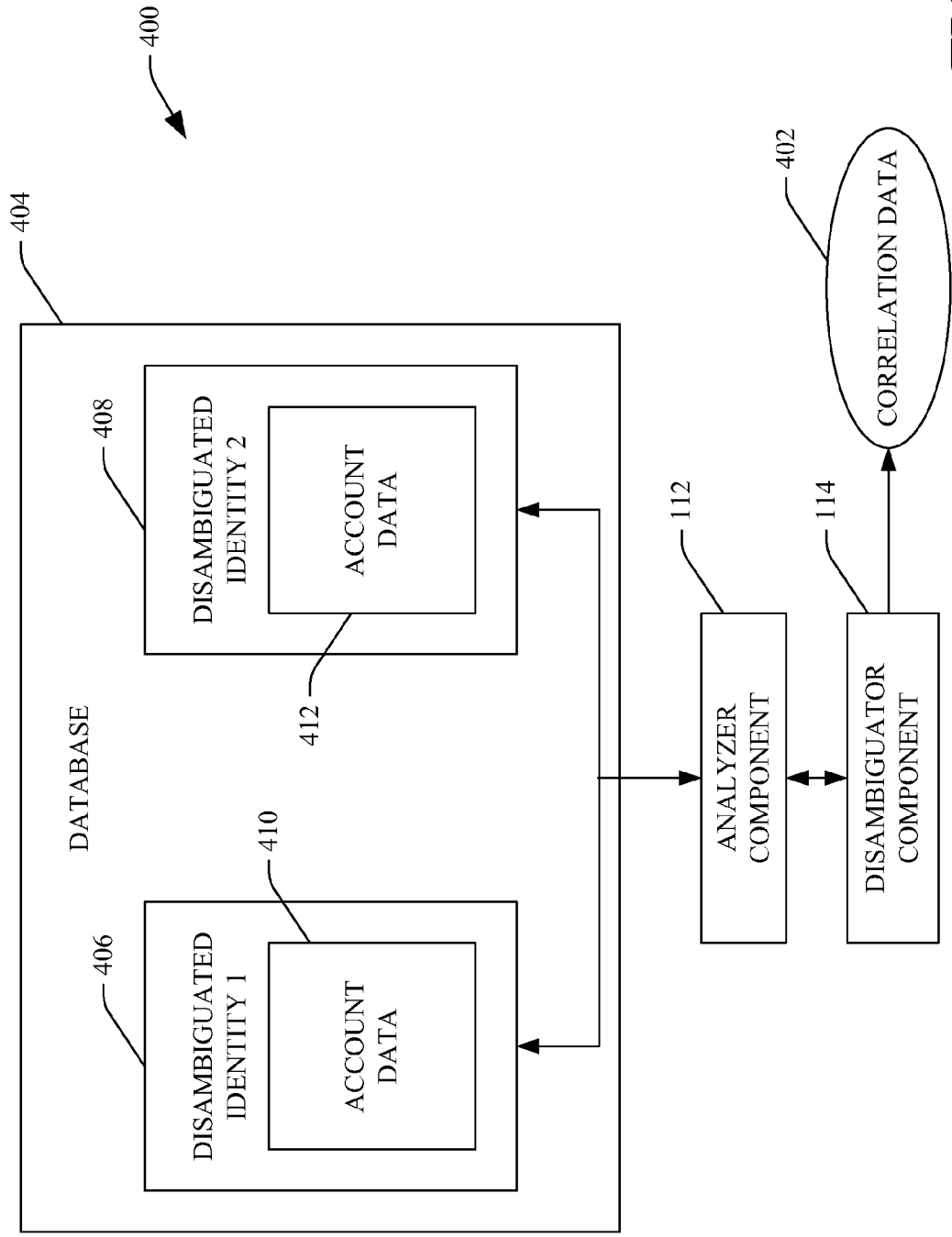
FIG. 4 is a functional block diagram of an example system that facilitates disambiguating identities/accounts across multiple online services based at least in part upon analysis of metadata corresponding to the identities.

Referring now to FIG. 4, another exemplary system 400 that facilitates disambiguating identities/accounts across multiple different online services is illustrated. The system 400 comprises the analyzer component 112 and the disambiguator component 114, which act in conjunction to generate correlation data 402 that indicates that two or more accounts are owned by the same user. In this example, a database 404 can include multiple disambiguated identities 406 and 408, wherein each of the disambiguated identities 406 and 408 has at least one account for at least one online service corresponding thereto. Each of the disambiguated identities 406 and 408 may have account data 410 and 412, respectively, corresponding thereto. The account data 410 and 412 may be or include data gleaned from data streams pertaining to one or more accounts owned by the disambiguated identity 406 or 408. In another example, the account data 410 and 412 can include data made public by the users corresponding to the disambiguated identities 406 and 408, respectively, such as nicknames, place of residence, occupation, known contacts, age, interests, etc.

The analyzer component 112 can perform a comparison on the account data 410 and 412 of the different disambiguated identities 406 and 408 and the disambiguator component 114 can automatically combine different disambiguated identities 406 and 408 if the comparison indicates that the account data 410 and 412 sufficiently correspond. This approach can be especially useful in instances where the disambiguated identities 406 and 408 correspond to people with substantially similar names. For instance, the disambiguated identities 406 and 408 may each correspond to a person named "Tom Smith". Previous analysis, however, does not show that the account(s) included in the disambiguated identity 406 are owned by the same user that owns the account(s) included in the disambiguated identity 408. The account data 410 and 412, however, may have certain data that is substantially similar, thereby allowing the disambiguator component 114 to indicate that the two disambiguated identities 406 and 408 are identities of the same user. For instance, the analyzer component 112 can compare the account data 410 and 412 and determine that a user represented by the disambiguated identities 406 and 408 is the same age, went to the same high school and lived in the same city. The results of this comparison can be passed on to the disambiguator component 114, which can determine that the same user corresponds to the disambiguated identities 406 and 408 with high probability.

Such analysis of the account data 410 and 412 may also be utilized by the search component 122 (not shown) to present search results to users searching for names corresponding to the disambiguating identities 406 and 408. For instance, a searcher may search for the name "Tom Smith", and the search component 122 can determine that a plurality of profiles are generated that have the name "Tom Smith" as the name of the owner of the disambiguated identities. The analyzer component 112 can compare the account data 410 and 412 of the different disambiguated identities and can provide the search component 122 with account data that is unique or mostly unique to the particular disambiguated identities 406 and 408. The search component 122 can then present search results to the searcher such that the unique or mostly unique data is highlighted.

Furthermore, these differences in the account data 410 and 412 can be utilized as a filter in providing better search results to a searcher. For instance, the analyzer component 112 can determine upon analyzing the account data 410 and 412 that the Tom Smith corresponding to the disambiguated identity 406 is a teacher that resides in the state of Washington while the Tom Smith corresponding to the disambiguated identity 408 is 42 and resides in Alaska. When a searcher performs a search for Tom Smith, the search component 122 can highlight these differences such that the searcher can quickly ascertain which "Tom Smith" is the person that is desirably found by the searcher.

Figure 5:
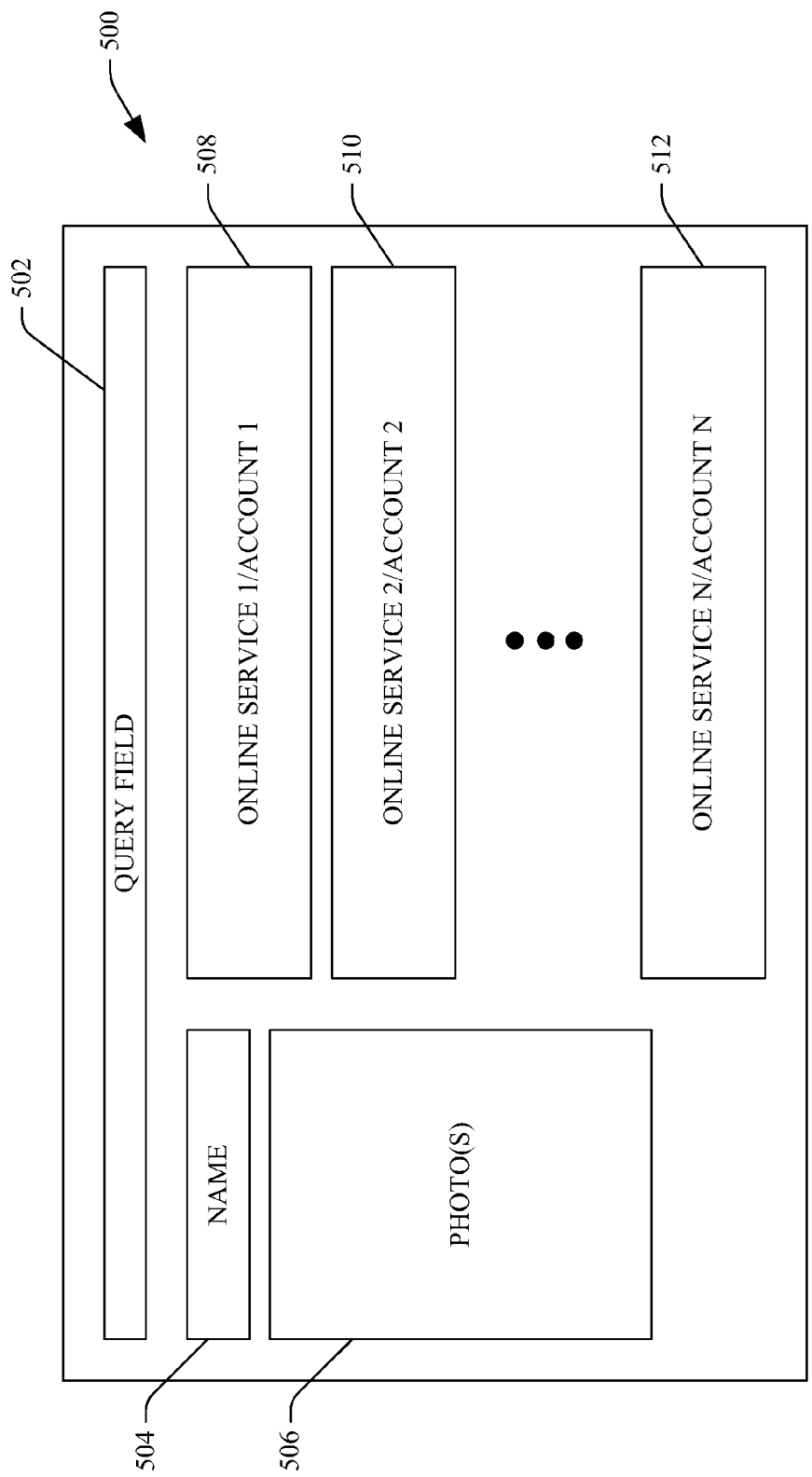
FIG. 5 is an example graphical user interface that facilitates displaying a profile of a user.

With reference now to FIG. 5, an exemplary graphical user interface 500 that can depict a profile of a user is illustrated. For example, the graphical user interface 500 can be presented to a searcher upon the searcher searching for a particular name (e.g., Tom Smith). The graphical user interface 500 includes a query field 502, wherein the query field 502 is configured to receive a query from a searcher. In this example, the query can be for a particular unique user and may include the name of the individual, occupation, location of the user, etc.

A search engine that is associated with the graphical user interface 500 can receive the query and can output a profile of a user that corresponds to the query. The profile can include a first field 504 that depicts a name of the user to the searcher. Along with the name the first field 504 can include any nicknames, aliases, etc. that are found to correspond to the user.

The profile can also include a second field 506 that displays one or more photos corresponding to the particular user (Tom Smith). These one or more photos can be automatically extracted from a public data stream pertaining to one or more accounts of the particular user with respect to one or more online services. In another example, the second field 506 can include a photo that is selected by the particular user after the user has claimed his profile.

The profile can also comprise a plurality of fields 508-512 that comprise data that is indicative of online services utilized by the particular user. For instance, the field 508 can include data that indicates that the particular user has an account with a first online service and can further comprise recent messages posted by the particular user by way of the first online service. Similarly, the field 510 can comprise data that indicates that the particular user has an account with a second online service and can further comprise recent messages posted by the particular user by way of the account with the second online service.

Additionally, the fields 508-512 can comprise data that indicates a probability that the certain accounts do in fact correspond to the user named in field 504 with the photo in field 506. For instance, the field 508 can include data that indicates that it is highly probable that the particular user represented in the graphical user interface 500 owns the accounts corresponding to the online service 508 shown to the searcher. These probabilities can be computed based upon message techniques utilized to disambiguate various accounts of the particular user. Moreover, the probabilities can be represented in any suitable manner. That is, the probabilities can be provided as text to the searcher, the fields can be color-coded according to probability that the accounts of the online services belong to the particular user.

While the profile is shown as displaying accounts of the particular user represented by this profile, it is to be understood that messages posted by the user can be displayed chronologically in the profile in accordance with when the particular user posted messages. In another example, the fields 508-512 can be arranged such that an online service used most by the particular user is displayed most prominently (e.g., in the uppermost field 508) while lesser used online services and message posts are displayed less prominently. In still yet another example, the fields 508-512 can be arranged based on most recent messages posted to accounts by the particular user. Therefore, in the example depicted in the graphical user interface 500, the field 508 displays data pertaining to a first account with respect to a first online service, where the particular user has posted a message by way of the first online service more recently than messages posted by way of another online service.

In summary, the graphical user interface 500 comprises an aggregated view of messages/activities undertaken by the particular user represented by the profile. This profile is searchable and many different profiles can be created for many different users. Again, however, privacy of users is respected as the profiles only depict data that is in publicly accessible data streams.

Figure 6:
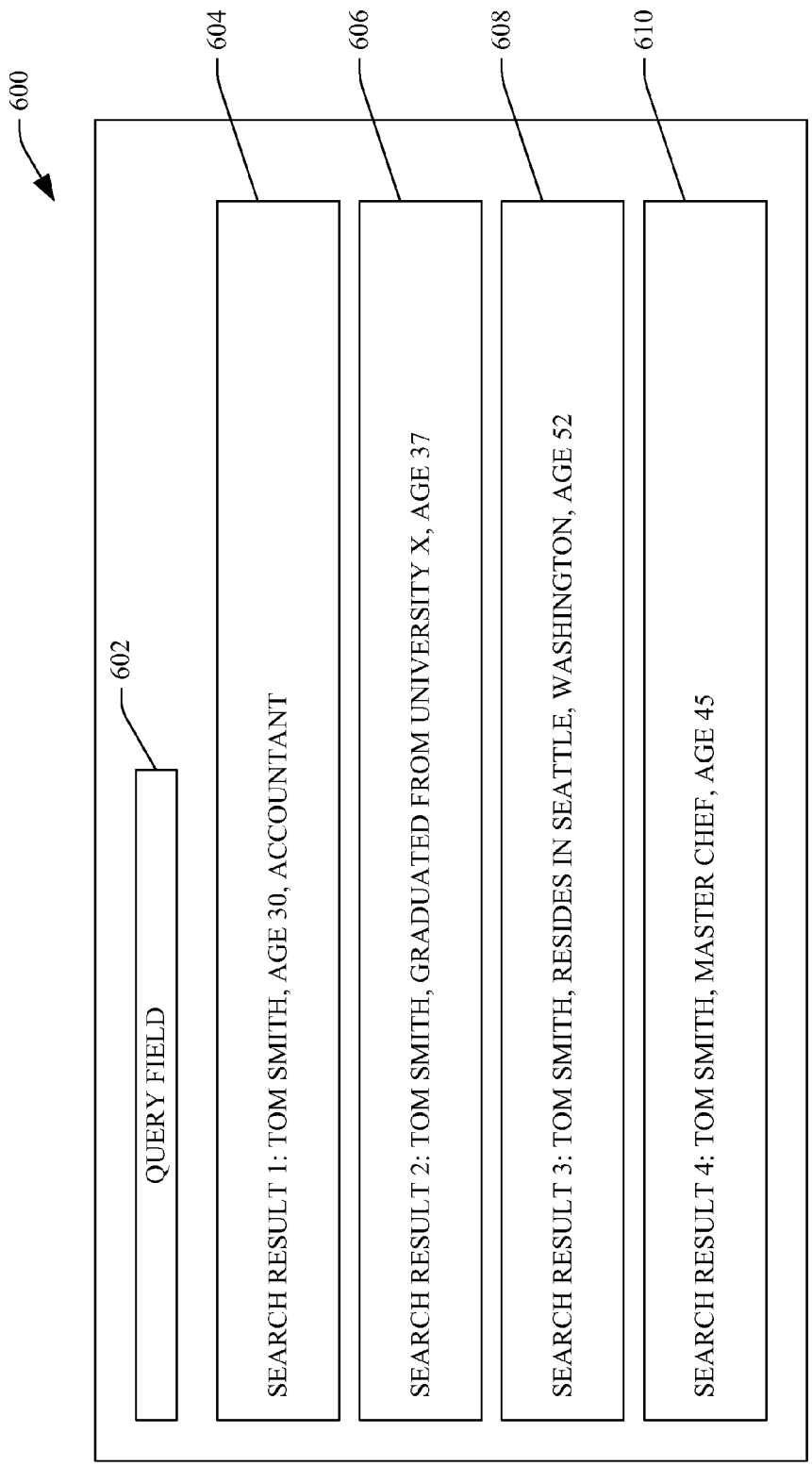
FIG. 6 is an example graphical user interface that facilitates displaying a plurality of search results responsive to receipt of a query for a particular user.

With reference now to FIG. 6, another exemplary graphical user interface 600 is illustrated. The graphical user interface 600 may be displayed in connection with a search engine. The graphical user interface 600 comprises a query field where a searcher can enter a query, for instance, for a particular user. The graphical user interface 600 also comprises a plurality of search results 604-610, wherein the search results corresponds to a query entered into the query field 602 by the searcher. In this example, the searcher has entered the query "Tom Smith" into the query field 602, and the search engine has provided a plurality of search results pertaining to the query.

As can be ascertained, there may be many Tom Smiths. Thus, a search engine may be configured to provide profiles pertaining to a plurality of disambiguated Tom Smiths. To aid the user in locating the user that they are searching for, the search engine can be configured to highlight different attributes of the disambiguated users whose profiles are provided as search results. For example, in the four search results 604-610 returned responsive to the searcher providing the query for Tom Smith, various attributes can be presented to the searcher that allows the searcher to locate the profile for the Tom Smith of interest to the searcher. For instance, the age of the users represented by the profiles corresponding to the four search results 604-610 are different; thus the search engine can be configured to highlight the age of the various users. Similarly, the search engine can be configured to highlight the occupation of the users if such occupation allows the user to differentiate between the identities corresponding to the search results. Therefore, if the searcher has the knowledge that the Tom Smith they are searching for lives in Seattle, Wash., and is in his 50s, the searcher can quickly ascertain that the search result 608 is the most relevant search result for the searcher. The searcher may then select the search result 608 and be provided with a graphical user interface similar to that shown in FIG. 5.

Additionally, provision of this data may prompt the searcher to refine their query to search for relevant account data pertaining to the user that the searcher wishes to locate. Thus, the searcher may first enter a name of a user of interest and be provided with a plurality of search results, and the search engine can be configured to highlight unique or relatively unique attributes of profiles returned based at least in part upon the received name. Upon reviewing such attributes, the searcher can quickly ascertain that it may be in the best interest of the searcher to further refine the search such as for instance, by searching for Tom Smith, Seattle, Wash. This can be used to provide more relevant search results to the searcher.

Pursuant to an example, the graphical user interface 600 can be provided upon a user searching for a name at the front page of a search engine. In another example, however, a searcher may enter through a domain specific area of the search engine, for instance, by selecting a hyperlink or other selectable icon to inform the search engine that the searcher wishes to search for profiles. Thus, the searcher can first select a tab or other selectable icon that informs the search engine that the searcher only wishes to review profiles of users and may thereafter enter a query, and the search engine can search over a list of profiles through utilization of the received query.

With reference now to FIGS. 7-10, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Figure 7:
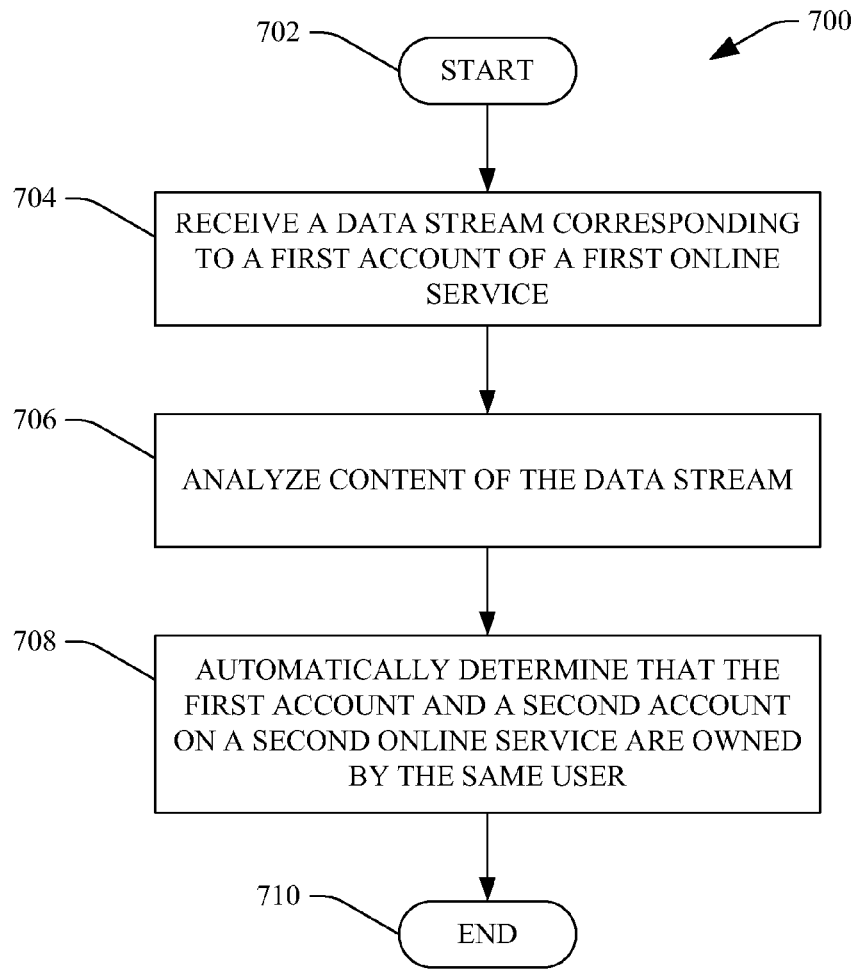
FIG. 7 is a flow diagram that illustrates an exemplary methodology for automatically disambiguating between identities/accounts across different online services.

Referring now to FIG. 7, an exemplary methodology 700 that facilitates automatically disambiguating identities/accounts over various online services is illustrated. The methodology 700 begins at 702, and at 704 a data stream corresponding to a first account of a first online service is received. The online service can be any one of the online services described above and the first account may be the account of a particular user that posts messages by way of the online service.

At 706, content of the data stream is analyzed. In a first embodiment, analysis of the content of the data stream can comprise comparing content of the data stream with content of another data stream pertaining to another account of a different online service. In another example, analysis of the content of the data stream can comprise searching for a particular identifier or data in the data stream that links the account of the first online service with another online service. In still yet another example, analysis of the content data of the data stream can comprise comparing content of the data stream with account data pertaining to another account of a different online service.

At 708, a determination is automatically made that the first account and a second account on a second online service are owned by the same user. That is, different online identities/accounts are disambiguated as being the same user. The methodology completes at 710.

Figure 8:
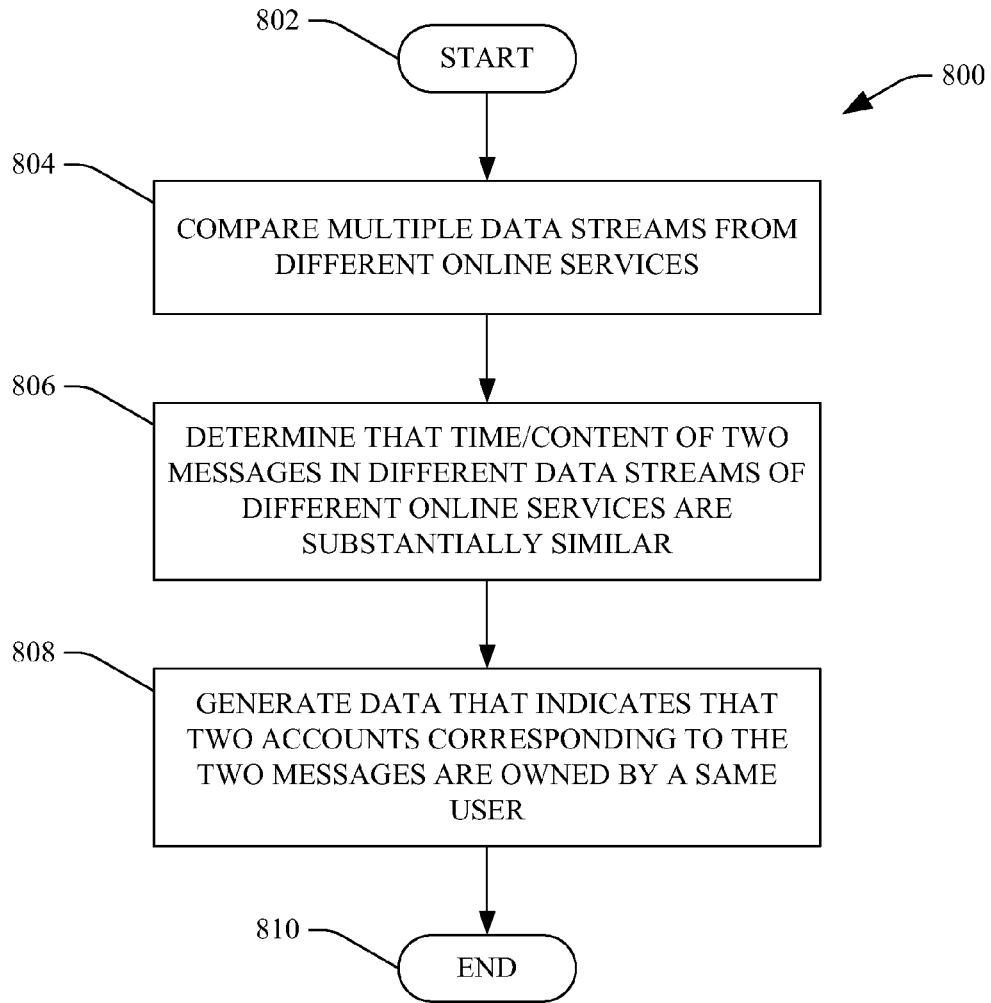
FIG. 8 is a flow diagram that illustrates an exemplary methodology that facilitates generating data that indicates that two accounts on different online services are owned by a same user.

Referring now to FIG. 8, an exemplary methodology 800 that facilitates disambiguating online identities/accounts over various online services is illustrated. The methodology 800 starts at 802, and at 804 multiple data streams with respect to different accounts of different online services are compared with one another. This comparison can be undertaken to search for substantially similar content in the data streams posted at substantially similar times.

At 806, a determination is made that time and content of two messages in different data streams output by different online services are substantially similar. Substantially similar can mean within several seconds, within several minutes or within several hours. As far as content goes, substantially similar can refer to identical content, content that is 95 percent similar, content that is 90 percent similar, etc.

At 808, data is generated that indicates that two accounts corresponding to the two messages are owned by a same user. This data can include data linking the accounts with respect to a particular name in a database such that the accounts are identified as belonging to a same user. The methodology 800 completes at 810.

Figure 9:
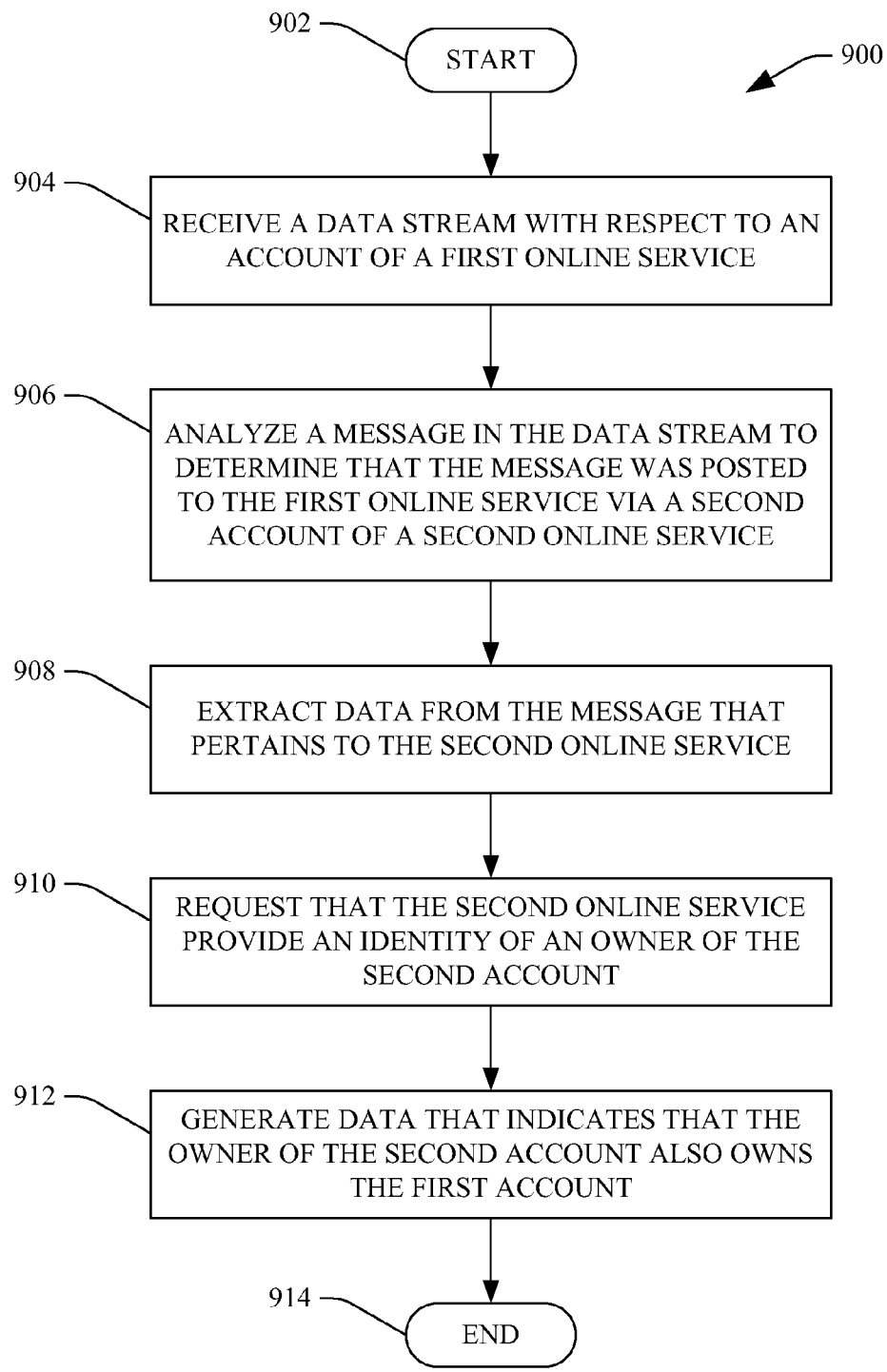
FIG. 9 is a flow diagram illustrating an exemplary methodology for disambiguating identities/accounts across multiple online services.

With reference now to FIG. 9, an exemplary methodology 900 that facilitates disambiguating identities/accounts over different online services is illustrated. The methodology 900 begins at 902, and at 904 a data stream is received with respect to an account of a first online service. At 906, a message in the data stream is analyzed to determine that the message was posted to the first online service by way of a second account on a second online service.

At 908, data is extracted from the message that indicates that the message corresponds to the second online service. This data may be an identifier, a type of format that is known to apply to the second online service, or other suitable data. At 910, a request is generated and the second online service with the request, wherein the request is configured to retrieve an identity of the owner of the second account from the second online service. For instance the second online service can expose an API that allows requests to be generated and provided to the second online service for identities of account owners. At 912, data is generated that indicates that the owner of the second account is also the owner of the first account. The methodology 900 then completes at 914.

Figure 10:
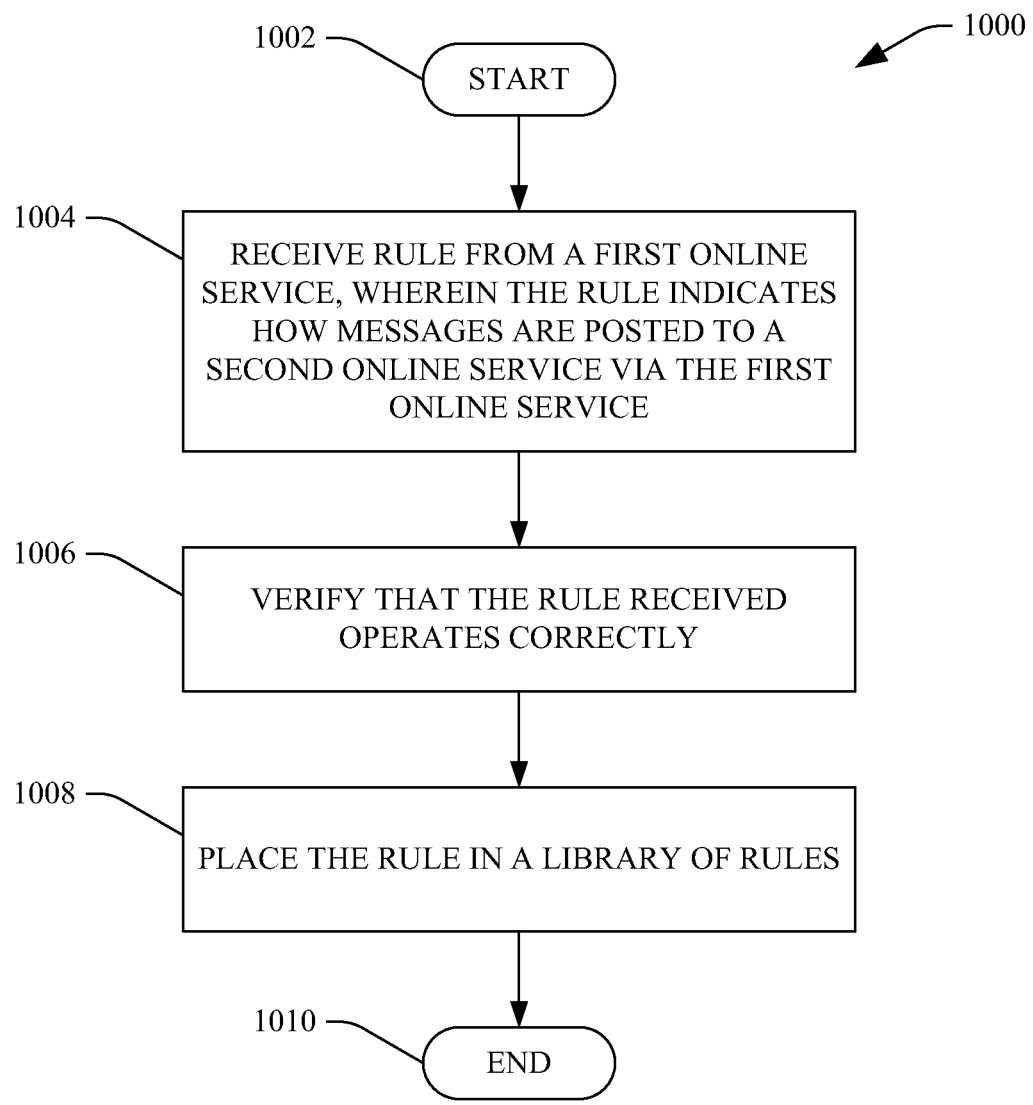
FIG. 10 is a flow diagram which illustrates an exemplary methodology for utilizing a rule to disambiguate identities/accounts across multiple online services.

Now referring to FIG. 10, an exemplary methodology 1000 that facilitates receipt and verification of a rule from an online service is illustrated. The methodology 1000 starts at 1002, and at 1004 a rule is received from a first online service, wherein the rule indicates how messages are posted to a second online service via the first online service. Thus, the user of the first online service can generate a message and cause such message to be posted to a data stream corresponding to the first online service. The first online service may also be configured to allow the user of the first online service to post the same message to a data stream corresponding to the second online service.

This posting of messages to the second online service via the first online service can include a plurality of different steps. These steps can be known to the first online service and a rule can be generated by the first online service that allows one to reverse these steps from the second online service back to the first online service.

At 1006, it is verified that the rule received operates correctly. This can be verified through a test case, through analysis of the provider of the rule, etc. At 1008, the rule is placed in a library of rules that can be utilized in connection with disambiguating identities/accounts over various online services. The methodology 1000 completes at 1010.

Figure 11:
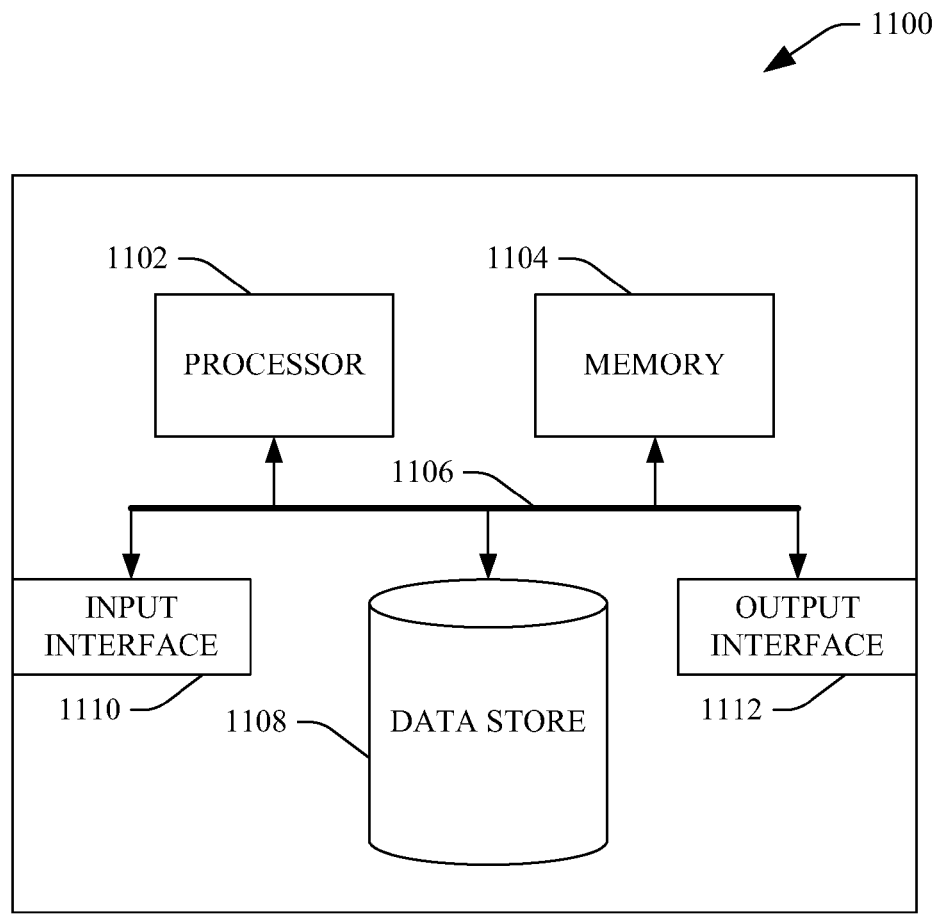
FIG. 11 is an exemplary computing system.

Now referring to FIG. 11, a high level illustration of an exemplary computing device 1100 that can be used in accordance with the systems and methodologies disclosed herein is illustrated. For instance, the computing device 1100 may be used in a system that supports disambiguating identities/accounts over different online services. In another example, at least a portion of the computing device 1100 may be used in a system that supports provision of a profile to a searcher upon receipt of a query pertaining to a particular user. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store rules, data that links two identities pertaining to accounts of different online services to a same user, etc.

The computing device 1100 additionally includes a data store 1108 that is accessible by the processor 1102 by way of the system bus 1106. The data store 1108 may be or include any suitable computer-readable storage, including a hard disk, memory, etc. The data store 1108 may include executable instructions, images, messages posted by users by way of various online accounts, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
at a computing device, analyzing a first data stream from a first online service, the first data stream comprising first content set forth by a particular user having a first account on the first online service;
at the computing device, analyzing a second data stream from a second online service, the second data stream comprising second content set forth by the particular user having a second account on the second online service;
at the computing device, generating data that indicates that the first account on the first online service and the second account on the second online service are both owned by the particular user based at least in part upon the analyzing of the first data stream from the first online service and the analyzing of the second data stream from the second online service.

2. The method of claim 1, wherein the analyzing of the first data stream of the first account and the analyzing of the second data stream of the second account comprises:
comparing the content of the first data stream with the content of the second data stream corresponding to the second account.

3. The method of claim 1, further comprising:
subsequent to generating the data that correlates the particular user with the second account, causing updates generated by the user at the first account or the second account to be posted to a profile for the particular user, wherein the profile comprises data that indicates that the first account and the second account are owned by the particular user.

4. The method of claim 1, further comprising:
receiving a query for the particular user; and
responsive to receipt of the query, outputting search results that indicate that the particular user owns the first account and the second account.

5. The method of claim 1, further comprising:
generating a first disambiguated identity for the particular user, wherein the first disambiguated identity is generated to indicate that the particular user owns the first account and the second account;
comparing account data of the first disambiguated identity with account data of a second disambiguated identity, wherein the second disambiguated identity indicates that a user corresponding to the second particular identity owns at least one account with a third online service; and
determining that the particular user corresponds to the first disambiguated identity and the second disambiguated identity based at least in part upon the comparing of the account data pertaining to the first disambiguated identity with the account data pertaining to the second disambiguated identity; and
updating content of a database to indicate that the particular user owns the first account, the second account, and the third account.

6. The method of claim 1, wherein the first online service is an online broadcasting service that broadcasts messages from the particular user to a plurality of subscribers to the particular user.

7. The method of claim 6, wherein the second online service is one of a social networking service, a blog service, a professional networking service, a photo sharing/retention service, or a location-based service.

8. The method of claim 1, further comprising:
prior to analyzing the first data stream and the second data stream, selecting a rule that identifies a portion of data in the first data stream that correlates the first online service with the second online service, and wherein analyzing the first data stream comprises searching for the portion of data.

9. The method of claim 8, wherein the rule is provided by the second online service.

10. The method of claim 8, further comprising:
requesting, from the second online service, an identity of an owner of the second account based at least in part upon the portion of data in the first data stream that correlates the first online service with the second online service;
receiving, from the second online service, the identity of the owner of the second account, wherein the identity of the owner is the particular user; and
correlating the particular user with the first account and the second account upon receipt of the identity of the owner of the second account from the second online service.

11. The method of claim 1, further comprising:
generating a profile for the particular user, wherein the profile comprises an indication that the particular user owns the first account and the second account.

12. The method of claim 11, further comprising:
receiving a request from the particular user to modify contents of the profile;
authenticating the particular user; and
modifying the contents of the profile in accordance with the request.

13. A computing apparatus comprising:
a processor; and
a memory that comprises components that are executable by the processor, the components comprising:
an analyzer component that performs an analysis over a data stream generated from a first account of a first online service, the data stream comprising a message set forth by a particular user that is publicly accessible, wherein the first account is owned by the particular user;
a disambiguator component that automatically determines that a second account on a second online service is also owned by the particular user based at least in part upon the analysis over the data stream performed by the analyzer component.

14. The computing apparatus of claim 13, wherein the first online service is a broadcasting service that broadcasts messages from the particular user, and wherein the disambiguator component requests data from the second online service based at least in part upon data corresponding to at least one message broadcast by the particular user.

15. The computing apparatus of claim 13, wherein the analysis performed by the analyzer component comprises comparing account data that pertains to the first account with account data that pertains to the second account.

16. The computing apparatus of claim 13, wherein the disambiguator component accesses a data store that comprises at least one rule, wherein the at least one rule comprises actions to be undertaken to link the second account with the first account.

17. The computing apparatus of claim 16, wherein the at least one rule is generated by the second online service and provided to the computing apparatus.

18. The computing apparatus of claim 13, wherein the memory further comprises a profile generator component that generates a profile for the particular user, wherein the profile comprises an indication that the first account and the second account are both owned by the particular user.

19. The computing apparatus of claim 18, further comprising a search component that receives a query for the particular user and returns the profile generated by the profile generator component responsive to receipt of the query.

20. A computer-readable medium comprising instructions that, when executed by a processor, cause the processor to perform acts comprising:
accessing a public data stream generated from a first account on a first online service, wherein the first account corresponds to a particular user;
determining that at least one message in the public data stream was generated by the first online service by way of a second account on a second online service;
analyzing content of the at least one message to obtain data that is indicative of the second account;
requesting an identity of an owner of the second account from the second online service based at least in part upon the content of the at least one message;
subsequent to requesting the identity of the owner of the second account from the second online service, receiving the identity of the owner of the second account from the second online service; and
generating data that correlates the particular user with the first account and the second account.

* * * * *